(12) United States Patent
Li et al.

(10) Patent No.: US 8,905,041 B2
(45) Date of Patent: Dec. 9, 2014

(54) SODIUM CHLORINE SPRAY TREATMENT OF THE LEAVES PRESENT ON TOBACCO PLANTS TO SIGNIFICANTLY REDUCE TSNAS IN CURED TOBACCO PRODUCED THEREFROM

(71) Applicant: Philip Morris USA Inc., Richmond, VA (US)

(72) Inventors: Qinglin Li, Richmond, VA (US); Walter Hempfling, Mechanicsville, VA (US); Marc Robert Krauss, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 0 days.

(21) Appl. No.: 13/741,980

(22) Filed: Jan. 15, 2013

(65) Prior Publication Data

US 2013/0146073 A1 Jun. 13, 2013

Related U.S. Application Data

(62) Division of application No. 12/035,228, filed on Feb. 21, 2008, now Pat. No. 8,353,300, which is a division of application No. 10/767,268, filed on Jan. 30, 2004, now abandoned.

(60) Provisional application No. 60/443,848, filed on Jan. 31, 2003.

(51) Int. Cl.
| | |
|---|---|
| A24B 15/28 | (2006.01) |
| A24B 15/30 | (2006.01) |
| A01G 7/06 | (2006.01) |

(52) U.S. Cl.
CPC .............. *A24B 15/28* (2013.01); *A24B 15/30* (2013.01); *A01G 7/06* (2013.01)
USPC .......................... 131/309; 131/310; 131/352

(58) Field of Classification Search
CPC ..... A61K 6/0017; A01N 25/10; A01N 37/46; C07K 14/79; C08L 89/00
USPC ........................................ 131/309, 310, 352
See application file for complete search history.

(56) References Cited

U.S. PATENT DOCUMENTS

| | | | |
|---|---|---|---|
| 3,593,506 | A | 7/1971 | Casada et al. |
| 4,581,057 | A | 4/1986 | Noodén |

(Continued)

OTHER PUBLICATIONS

West, D. W. and Black, J. D. F. "Irrigation Timing—Its Influence on the Effects of Salinity and Waterlogging Stresses in Tobacco Plants." Jul. 6, 1977. Soil Science: vol. 125. pp. 367-376.*

(Continued)

*Primary Examiner* — Philip Tucker
*Assistant Examiner* — Vicki Wu
(74) *Attorney, Agent, or Firm* — Buchanan Ingersoll & Rooney PC

(57) ABSTRACT

Methods for increasing the concentration of antioxidants during senescence and curing of tobacco leaves include application of a chemical solution. The methods include spraying the solution onto the tobacco plant prior to harvest and/or applying the chemical solution to the soil surrounding roots of growing tobacco plants. The application of the chemical solution preferably occurs between topping and harvest, and is optimized to simulate the production of antioxidants and interfere with the formation of TSNAs during curing. The tobacco can be burley tobacco subjected to air curing.

26 Claims, 3 Drawing Sheets

(56) References Cited

U.S. PATENT DOCUMENTS

| | | | |
|---|---|---|---|
| 4,671,816 A | 6/1987 | Bliesener et al. | |
| 4,943,315 A | 7/1990 | Schulz et al. | |
| 5,201,931 A | 4/1993 | Abrams et al. | |
| 5,391,568 A | 2/1995 | Chung | |
| 5,627,132 A | 5/1997 | LeBeau | |
| 5,829,449 A | 11/1998 | Hersh et al. | |
| 5,851,953 A | 12/1998 | Pehu et al. | |
| 6,138,683 A | 10/2000 | Hersh et al. | |
| 6,564,808 B1* | 5/2003 | Hempfling et al. | 131/297 |
| 6,755,200 B1* | 6/2004 | Hempfling et al. | 131/309 |
| 8,353,300 B2* | 1/2013 | Li et al. | 131/309 |
| 2003/0056801 A1 | 3/2003 | Krauss et al. | |
| 2005/0072047 A1* | 4/2005 | Conkling et al. | 47/58.1 FV |

OTHER PUBLICATIONS

"Nitrites", http://ace.orst.edu/info/extroxnet/faqs/additive/preserca.htm (1997).
Anna Wiernik et al., "Effect of Air-Curing on the chemical Composition of Tobacco", *Recent Adv. Tob. Sci.*, (1995), 21: 39-80.
Jaw-Neng Lin et al., "Effect of exogenous $H_2O_2$ on leaf senescence Effect of oxidative Stress caused by hydrogen peroxide on senescence of rice leaves", http://ejournal.sinica,edu,tw/bbas/content/1998/3/bot93-03.html.
Con Baker, et al., "Production of Extracellular Phenolic Antioxidants Provides a Buffer Against Low-Level Buildup of Ros in Plants", http://www.nps.ars.usda.gov/publications/publications.htm?SEQ_NO_115=117167.
Przemyslaw Wojtaszek, "Oxidative burst: an early plant response to pathogen infection", *Biochem. J.*, (1997) 322:661-692.
J. Brian Mudd, "Biochemical Reactions of Ozone in Plants 1", PSW-GTR-164; http://www.rlf.psw.fs.fed.us/pubs/psw-gtr-164/fulltext/mudd/mudd.html.
Yoshiko Miyagawa et al., "Evaluation of the Defense system in Chloroplasts to Photooxidative Stress Caused by Paraquat Using Transgenic Tobacco Plants Expressing Catalase from *Escherichia coli*", *Plant Cell Physiol*, 41(3): 311-320 (2000).
James F. Dat et al., "Changes in Salicylic Acid and Antioxidants during Induced Thermotolerance in Mustard Seedlings", *Plant Physiol.* (1998) 118: 1455-1461.
Ron Mittler et al., "Transgenic tobacco plants with reduced capability to detoxify reactive oxygen intermediates are hyperresponsive to pathogen infection", PNAS, Nov. 23, 1999, vol. 96, No. 24, pp. 14165-14170.
Extoxnet, Extension Toxicology Network, Pesticide Information Profiles—Paraquat—http://ace.orst.edu/info/extoxnet/faqs/additive/preserca.htm.
Benzie and Strain, *Meth. Enzymology* 299: 15-27 (1999).
R. Anderson, "Assessment of the roles of vitamin C, vitamin E, and beta-carotene in the modulation of oxidant stress mediated by cigarette smoke-activated phagocytes", *American Journal of Clinical Nutrition*, Jan. 1991; 53 (1 Suppl.): 358 S-361 S.
Padma et al., "Anticarcinogenic effect of betel leaf extract against tobacco carcinogens", *Cancer Letters*, Jun. 1989; 45 (3): 195-202.
A.B. Weitberg et al., "Oxygen radicals potentiate the genetic toxicity of tobacco-specific nitrosamines", *Clinical Genet*. Feb. 1993; 43 (2): 88-91.
T. Rundlof et al., "Potential nitrite scavengers as inhibitors of the formation of N-nitrosamines in solution and tobacco matrix systems", *Journal of Agricultural Food Chemistry*, Sep. 2000; 48 (9): 4381-8.
A.B. Weitberg et al., "Effect of vitamin E and beta-carotene on DNA strand breakage inducted by tobacco-specific nitrosamines and stimulated human phagocytes", *Journal of Exp. Clinical Cancer Research*, Mar. 1997; 16 (1): 11-4.
A.B. Weitberg et al., "The effect of epigallocatechin galleate and sarcophytol A on DNA strand breakage induced by tobacco-specific nitrosamines and stimulated human phagocytes", *Journal of Exp. Clinical Cancer Research*, Sep. 1999; 18 (3): 433-7.
S.S. Hecht, "DNA adduct formation from tobacco-specific N-nitrosamines", *Mutation Research*, Mar. 8, 1999; 424 (1-2): 127-42.
Camia Borek, Ph.D., "Aging Gracefully with Antioxidants", from the Mar. 1998 *Issue of Nutrition Science News*.
Cui et al., "Effect of Maleic Hydrazide Application on Accumulation of Tobacco-Specific Nitrosamines in Air-Cured Burley Tobacco", Journal of Agricultural and Food Chemistry, Dec. 1994, vol. 42(12), pp. 2912-2916 (Abstract Only).
Chamberlain et al., "Effects of Curing and Fertilization on Notrosamine Formation in Bright and Burley Tobacco", Beitrage zur Tabakforschung, vol. 15(2), pp. 87-92 (Abstract Only).
MacKown et al., "Nitrate Assimilation in Tobacco Leaves Treated with Maleic Hydrazide to Control Axillary Bud Growth", Crop Science, vol. 35(1), pp. 195-199 (Abstract Only).
International Search Report and Written Opinion dated Jan. 21, 2005 for PCT/US04/02546.
Kim et al., 1986. Effects of abscisic acid on some physiological responses of the leaves *Nicotiana tabacum* L. Korean Journal Botany 29(1): 41-51.
Petkova et al. 1992. ABA content in young tobacco plants treated with some esters of aliphatic dicarboxylic acids. Plant Physiology, Sofia, 18(3): 3-7.
Agboma et al. 1997. Effect of foliar applications of glycinebetaine on yield components of drought-stressed tobacco plants. Expl. Argric. 33: 345-352.
Rensburg et al. 1993. Applicability of abscisic acid and (or) proline accumulation as selection criteria for drought tolerance in *Nicotiana tabacum*. Can. J. Bot 72: 1535-1540.

* cited by examiner

SODIUM CHLORINE SPRAY TREATMENT OF THE LEAVES PRESENT ON TOBACCO PLANTS TO SIGNIFICANTLY REDUCE TSNAS IN CURED TOBACCO PRODUCED THEREFROM

CROSS REFERENCE TO RELATED APPLICATIONS

This application claims the benefit of U.S. Ser. No. 60/443,848 filed on Jan. 31, 2003, which is herein incorporated by reference in its entirety for all purposes. This application is a division of application Ser. No. 12/035,228, filed on Feb. 21, 2008, now U.S. Pat. No. 8,353,300, which is a division of application Ser. No. 10/767,268, filed on Jan. 30, 2004, now abandoned.

FIELD OF INVENTION

The invention relates to methods for increasing the concentration of advantageous antioxidants in tobacco leaves by spraying at least one chemical solution onto a growing tobacco plant and/or soil treatment of growing tobacco plants. The application of the chemical solution preferably occurs between topping and harvest, and can be optimized to stimulate the production of antioxidants in tobacco leaves which interfere with the formation of TSNAs during curing of the tobacco leaves.

BACKGROUND OF THE INVENTION

Tobacco-specific nitrosamines (TSNAs), such as N-nitrosonornicotine (NNN) and 4-(methylnitrosamino)-1-(3-pyridyl)-1-butanone (NNK), can be found in smokeless tobacco; mainstream smoke; and side stream smoke of cigarettes. It has been reported that air-cured and flue-cured tobacco contain tobacco-specific nitrosamines. See, "Effect of Air-Curing on the Chemical Composition of Tobacco", Anna Wiernik et al., Recent Adv. Tob. Sci, (1995), 21: 39-80. According to Wiernik et al., TSNAs are not present in significant quantities in growing tobacco plants or fresh cut tobacco (green tobacco), but are formed during the curing process. Bacterial populations which reside on the tobacco leaves are stated to largely cause the formation of nitrites from nitrate during curing and possibly effect the direct catalysis of the nitrosation of secondary amines at physiological pH values. The affected secondary amines include tobacco alkaloids, which form TSNAs when nitrosated.

Because curing of tobacco leaves is normally performed by the farmer who grows the tobacco, a simple, economical and non-labor-intensive method of reducing TSNA levels in the cured tobacco leaves is desirable.

SUMMARY OF THE INVENTION

According to one embodiment, a method of reducing tobacco-specific nitrosamines in cured tobacco, comprises raising the levels of antioxidants in tobacco prior to being cured, wherein the levels of antioxidants are raised by spraying a chemical solution onto an aerial part (i.e., that part of the plant growing above ground) of a tobacco plant prior to harvesting and wherein the chemical solution effects an increase in the level of antioxidants in the tobacco plant. The chemical solution preferably includes a plant growth hormone such as abscisic acid (ABA) or analog thereof, a plant activator such as salicylic acid (SA) (commercially available as ACTIGARD®) or analog thereof, a plant activator such as a harpin protein containing product commercially available as MESSENGER®, a herbicide such as methyl viologen (MV) or analog thereof, a stress inducing agent such as hydrogen peroxide, sodium chloride (NaCl), or sulfur dioxide, or combinations thereof. Preferably, the analog of MV is Paraquat (a quaternary nitrogen herbicide widely used for weed control). Preferably, the tobacco plants are sprayed with the chemical solution in a single application or multiple applications about 1-3 weeks prior to harvest. Preferably, the tobacco is burley tobacco and the method further includes air curing the burley tobacco. The tobacco is preferably incorporated in a cigarette.

According to another embodiment, a method of reducing tobacco-specific nitrosamines in cured tobacco, comprises raising the levels of antioxidants in tobacco prior to being cured, wherein the levels of antioxidants are raised by soil treatment of tobacco plants prior to harvesting and wherein the soil treatment effects an increase in the level of antioxidants in the tobacco plant. The soil can be treated with a chemical solution which preferably includes a plant growth hormone such as abscisic acid (ABA) or analog thereof, a plant activator such as salicylic acid (SA) (commercially available as ACTIGARD®) or analog thereof, a plant activator such as a harpin protein containing product commercially available as MESSENGER®, a herbicide such as methyl viologen (MV) or analog thereof, a stress inducing agent such as hydrogen peroxide, sodium chloride, or sulfur dioxide, or combinations thereof. Preferably, the analog of MV is Paraquat (a quaternary nitrogen herbicide widely used for weed control). Preferably, the soil is treated in a single application or multiple applications about 1-3 weeks prior to harvest. Preferably, the tobacco is burley tobacco and the method further includes air curing the burley tobacco. The tobacco is preferably incorporated in a cigarette.

DETAILED DESCRIPTION OF PREFERRED EMBODIMENTS OF THE INVENTION

The amount of tobacco specific nitrosamines (TSNAs) in cured tobacco leaves can be reduced by spraying growing tobacco plants with a chemical solution and/or treating the soil surrounding roots of growing tobacco plants with a chemical solution. In particular, TSNAs in cured tobacco leaves may be reduced by raising the levels of antioxidants in the tobacco leaves prior to harvesting the plants.

Figure 1:
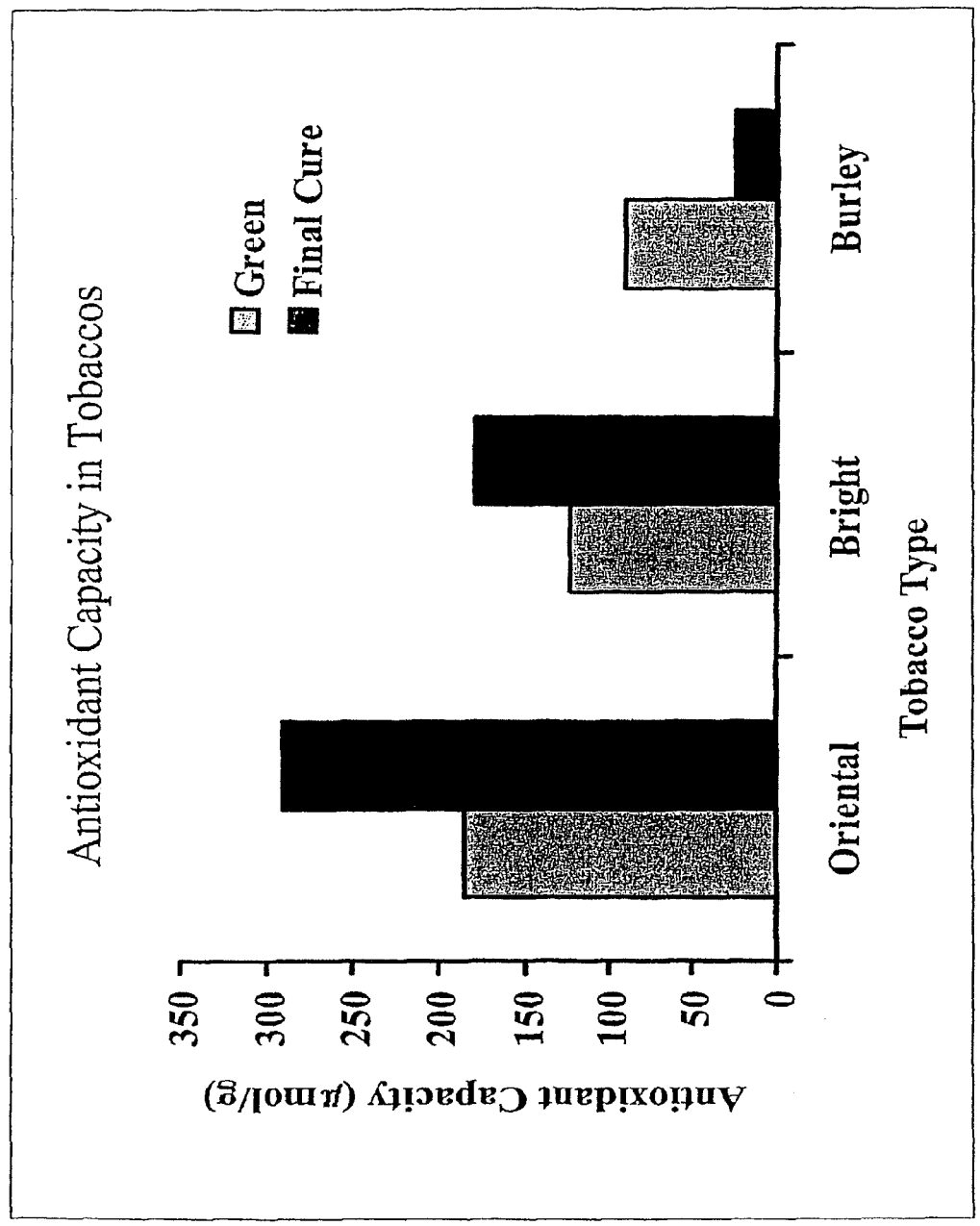
FIG. 1 depicts a graph of antioxidant capacity of green and cured Oriental, bright and burley tobacco grown without a spray treatment to raise the antioxidant capacity.

The antioxidant levels in tobacco leaves sprayed with the chemical solution are preferably raised at least 25%, preferably at least 30%, and more preferably at least 50% compared to tobacco leaves of untreated plants grown without the spray treatment. Likewise, the antioxidant levels in tobacco leaves of tobacco plants grown in soil treated with the chemical solution are preferably raised at least 25%, preferably at least 30%, and more preferably at least 50% compared to tobacco leaves of untreated plants which without the soil treatment. FIG. 1 shows an example of the antioxidant capacity of green and cured Oriental, bright and burley tobacco obtained from untreated plants.

It is believed that TSNAs are formed predominantly during the curing process. While not wishing to be bound by theory, it is believed that the amount of TSNAs in cured tobacco leaves results from the reaction of a reactive nitrosating species with the tobacco alkaloids.

The amount of antioxidants in tobacco leaves during the time of air-curing is believed to be advantageous to the inhibition of TSNA formation. An elevated concentration of native antioxidants during senescence and air-curing of tobacco can be obtained by spraying of a chemical solution preferably comprising an aqueous solution containing one or more chemical compounds onto the growing tobacco plant and/or treating the soil surrounding roots of growing tobacco plants with the aqueous solution. For example, it is possible to increase foliar contents of native antioxidants by stressing the tobacco plant, e.g., using ABA to reduce the availability of carbon dioxide necessary for photosynthesis. Preferably the tobacco is burley tobacco. The spraying of the solution and/or soil treatment preferably occurs between topping (i.e., removal of the flower from the tobacco plant to stimulate leaf production) and harvest, and is intended to stimulate the production of antioxidants and interfere with the formation TSNAs during curing of the tobacco. Preferably, the level of antioxidants is increased to an amount sufficient to prevent significant nitrosation during the yellowing and browning phases of curing. The chemical spraying and/or soil treatment can be carried out only once or the tobacco plants can be sprayed and/or subjected to soil treatment more than once. For example, the plants can be sprayed at layby (when the plants are about knee-high) and the spray treatment can be repeated periodically such as every 5 to 15 days until harvest. Likewise, the soil in which the plants are grown can be treated at layby and the soil treatment can be repeated periodically such as every 5 to 15 days until harvest.

The spray and/or soil treatment can be combined with other methods of elevating tobacco leaf antioxidants to a level that inhibits nitrosation. For example, the antioxidants can be raised by pruning of the tobacco plants (e.g., root pruning and xylem cutting) prior to harvest. Thus, root pruning and/or xylem cutting may be used to inhibit TSNA formation during air-curing. Under the stressful conditions caused by root pruning and xylem cutting, the plant's capacity to assimilate $CO_2$ is reduced, and the photosynthetic electron flux to $O_2$ will increase resulting in the increased production of superoxide and hydroxyl radicals. These molecules induce antioxidants to cope with the oxidative stress. (See commonly-owned U.S. patent application Ser. No. 10/235,636, filed on Sep. 6, 2002, which is incorporated by reference in its entirety herein).

Disturbances in photosynthetic activity—can be used to cause the formation of reactive oxygen species. Thus, chemicals that directly affect chloroplast activity can stimulate processes that induce formation of reactive oxygen species. Redox-active herbicides such as the diphenyl ethers (e.g., acifluorfen) can act through the production of reactive oxygen. Such herbicides can cause the activity of antioxidants such as ascorbate, glulathione and glutathione reductase to increase while the plant is actively defending itself against the herbicide. Bipyridyl herbicides, such as Paraquat (also known as methyl viologen) and Diquat, can be used to increase oxidative stress directly by generating reactive oxygen radicals.

Growing tobacco plants can be sprayed with a chemical solution, preferably an aqueous solution, which effects an increase in antioxidant levels in the tobacco leaves and thus reduced TSNAs during curing of the tobacco leaves. Likewise, the soil of tobacco plants can be treated with a chemical solution, preferably an aqueous solution, which effects an increase in antioxidant levels in the tobacco leaves and thus reduced TSNAs during curing of the tobacco leaves. Preferably, a chemical solution containing at least one chemical compound is sprayed onto growing tobacco plants using farm equipment suitable for spray application of liquids to tobacco plants. If desired, spraying of such compounds can be combined with other nitrosamine-reducing treatments such as root pruning and xylem cutting, to result in tobacco leaves with exceptionally low nitrosamine contents during the curing process. Further, the soil surrounding the roots of tobacco plants can be sprayed and/or irrigated using a chemical solution which effects the desired increase in the antioxidant levels in the tobacco leaves.

1. Definitions and Abbreviations 1.1 Definitions

By the term "herbicide" is meant to include reagents that increase antioxidant activity. For example, preferred herbicides include but are not limited to redox-active herbicides and bipyridyl herbicides. Preferred redox-active herbicides include diphenyl ethers (e.g., acifluorfen and acifluorfen sodium). Preferred bipyridyl herbicides include methyl viologen (e.g., Paraquat) and Diquat.

By the term "plant growth hormone" is meant to include those plant growth hormones which modulate the antioxidant level and thereby TSNA in the tobacco plant. Preferred plant growth hormones are abscisic acid (ABA) and jasmonic acid.

By the term "plant activator" is meant to include reagents which modulate the antioxidant level and thereby TSNA in tobacco plants. A preferred plant activator is a salicylic acid, or an analog of salicylic acid, (e.g., ACTIGARD®), or a harpin protein (e.g., MESSENGER®).

By the term "stress inducing reagents" is meant to include reagents which modulate the antioxidant level and thereby TSNA in tobacco. Preferred stress inducing reagents include sulfur dioxide, sodium chloride and hydrogen peroxide.

1.2 Abbreviations

ABA abscisic acid
   FRAP Ferric-Reducing Antioxidant Power
   HPLC high performance liquid chromatography
   MV methyl viologen
   NNK 4-(methylnitrosamino)-1-(3-pyridyl)-1-butanone
   NNN N-nitrosonornicotine
   SA salicylic acid
   TSNA tobacco-specific nitrosamines 2. Herbicides One embodiment comprises spraying an effective amount of at least one herbicide such as methyl viologen (MV) or one or more analogs thereof (e.g., Paraquat), or Diquat (chemical name: 1',1'-ethylene-2,2'-bipyridyl-diylium) and/or other herbicides, to the aerial part of topped tobacco plants several weeks or days before harvesting. Also contemplated are diphenyl ethers. Preferred diphenyl ethers include but are not limited to acifluorfen and acifluorfen sodium, which respectively have the chemical names of 5-[2-chloro-4-(trifluoromethyl)phenoxy]-2-nitrobenzoate and sodium 5-[2-chloro-4-(trifluoro-methyl)phenoxy]-2-nitrobenzoate. Preferably, the spraying is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting). It has been found that such spraying results in a significant reduction of TSNAs during air-curing of burley tobacco. The reduction of TSNAs during curing may be accompanied by an increase in total antioxidant activity, as measured by the Ferric-Reducing Antioxidant Power assay ("FRAP").

Another embodiment comprises applying an effective amount of at least one herbicide such as methyl viologen (MV) or one or more analogs thereof, such as Paraquat (chemical name: 1,1'-dimethyl-4,4'-bipyridinium-), and/or other herbicides, to the soil surrounding roots of topped tobacco plants several weeks or days before harvesting. Preferably, the soil treatment is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting).

The herbicide(s) can be applied in a concentration of about 0.01 mM to about 0.3 mM, more preferably 0.05 to about 0.15 mM and most preferably in an amount of about 0.08 to about 0.11 mM (e.g., about 0.1 mM Paraquat) (and every 0.01 mM unit inbetween these ranges). Typically about 50 mL to about 500 mL of the solution is sprayed per plant, more preferably an amount of about 100 mL to about 300 mL and most preferably about 150 mL to about 250 mL of solution is sprayed onto the leaves or the soil of each plant.

3. Plant Activators

Another embodiment comprises spraying an effective amount of a plant activator, such as salicylic acid (SA), or one or more analogs thereof, preferably ACTIGARD® (active ingredient chemical name: 1,2,3-benzothiadiazole-7-thiocarboxylic acid-5-methyl-ester), or a harpin protein such as MESSENGER® (harpin, HrpN from *Erwinia amylovora*; GenBank Accession No: AAC31644), to, for example, the aerial part of topped tobacco plants several weeks or days before harvesting. ACTIGARD® is manufactured by Syngenta Crop Protection, Greensboro, N.C. MESSENGER® is available from Eden Bioscience Corporation, Bothell, Wash. Preferably, the spraying is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting). For example, ACTIGARD® can be sprayed onto the tobacco plants in a single application at a concentration of about 1 ounce (oz) per acre about 1 week prior to harvest or in a series of applications at the same or different concentrations, e.g., 1 oz/acre, 0.5 oz/acre and/or 0.25 oz/acre. MESSENGER® can be sprayed onto the tobacco plants in a single application at a concentration of 9 ounces per acre or in a series of applications at the same or different concentrations. ACTIGARD® is believed to disable enzyme activity thereby creating oxidative stress to which the tobacco plant responds by production of antioxidants. MESSENGER® is believed to create a plant response known as systemic acquired resistance that manifests a production of antioxidants. Due to the increase in antioxidant level in the treated tobacco leaves, a significant reduction of TSNAs can be obtained during curing of the tobacco leaves.

A further embodiment comprises applying an effective amount of salicylic acid (SA), or one or more analogs thereof, preferably ACTIGARD®, or a harpin protein such as MESSENGER®, to the soil surrounding roots of topped plants several weeks or days before harvesting. Preferably, the soil treatment is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting).

Salicylic acid and its analogs such as ACTIGARD® can be used to treat plants in concentrations of about 0.1 mM to about 10 mM, or more preferably about 0.5 mM to about 2 mM and most preferably in an amount of about 0.8 mM to about 1.2 mM. Typically about 50 mL to about 500 mL of the solution is sprayed per plant, more preferably an amount of about 100 mL to about 300 mL and most preferably about 150 mL to about 250 mL of solution is sprayed onto the leaves of each plant or administered onto the soil surrounding the roots of each plant.

A harpin protein such as MESSENGER® can be used to treat the leaves or roots of the plants in an amount of about 4.5 oz/acre to about 9 oz/acre (9 oz/acre is the FDA approved amount).

4. Plant Growth Hormones

Another embodiment of the present invention comprises spraying an effective amount of at least one plant growth hormone such as abscisic acid (ABA), or one or more of its more stable analogs, or jasmonic acid or one or more analogs thereof preferably onto the aerial part of topped tobacco plants several weeks or days before harvesting. Preferably, the spraying is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting). Due to the increase in antioxidant level in the treated tobacco leaves, a significant reduction of TSNAs can be obtained during curing of the tobacco leaves.

Figure 2:
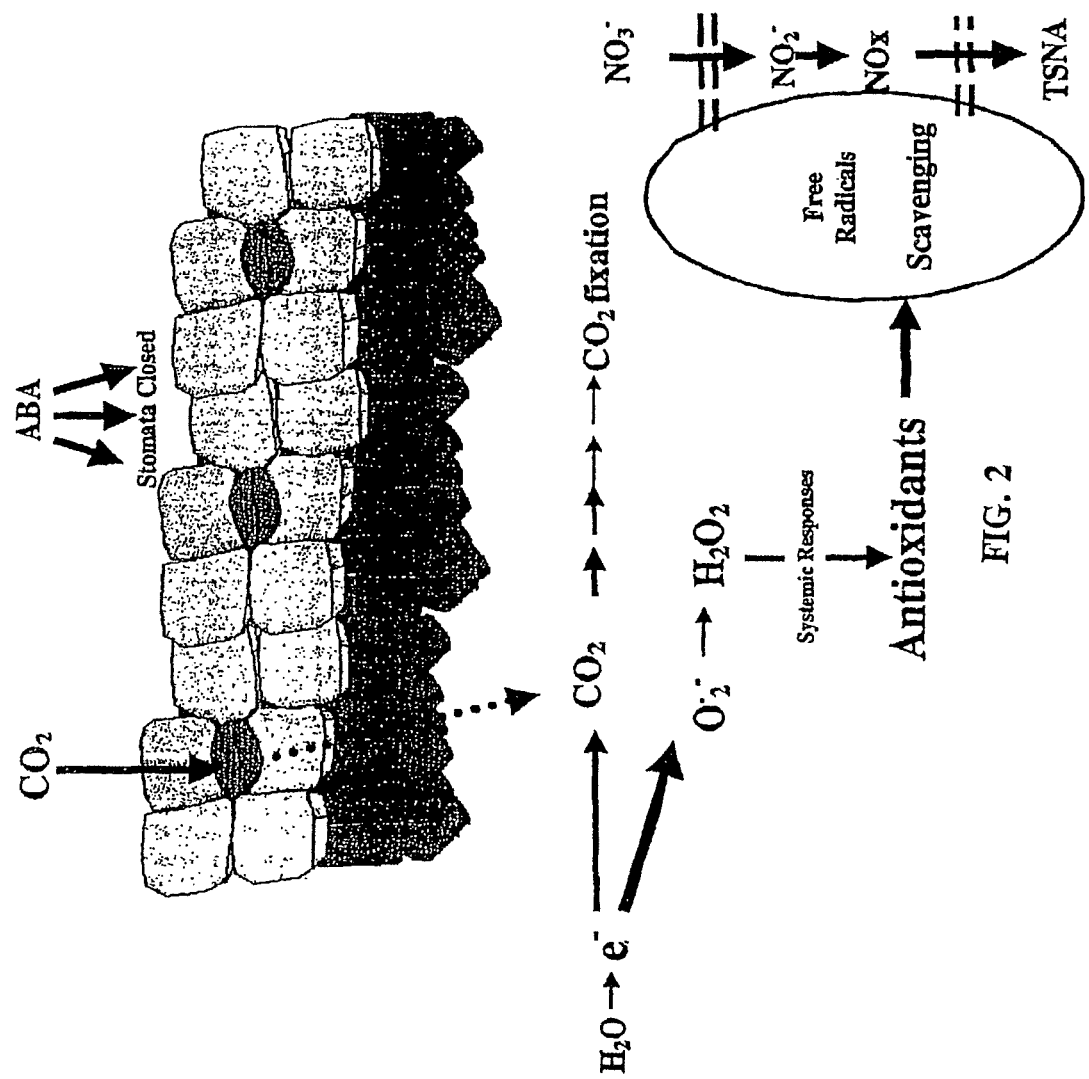
FIG. 2 depicts a mechanism by which antioxidants in tobacco inhibit TSNA formation.
Figure 3:
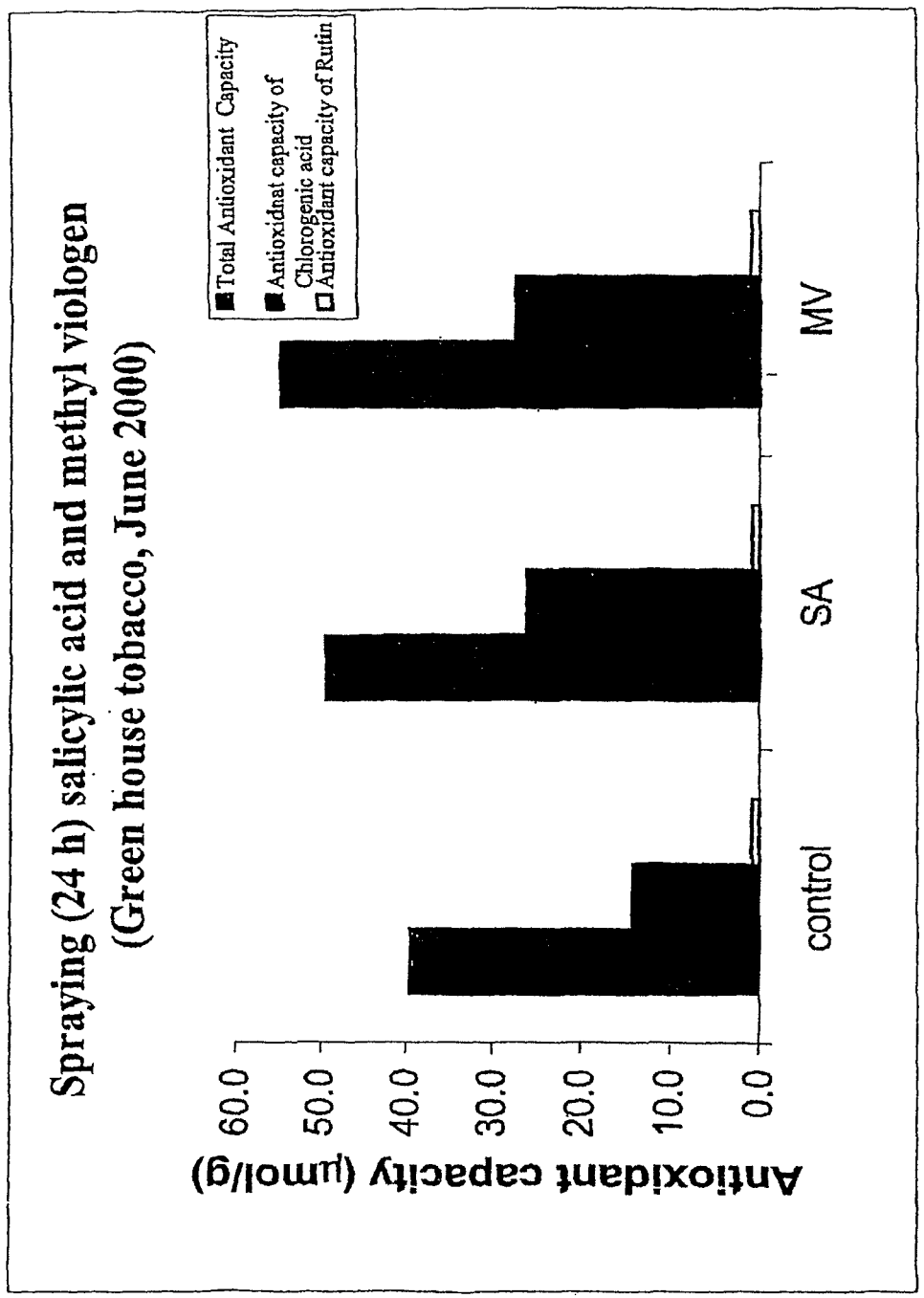
FIG. 3 depicts a graph of the effects on antioxidant capacity of spraying salicylic acid and methyl viologen onto greenhouse tobacco.

ABA is a major controller of stomatal closing, and naturally increases in concentration in tobacco leaves as a response to water-deficit stress. See FIG. 2. The $CO_2$ supply for photosynthesis can be interrupted leading to enhancement of the native leaf antioxidants. A solution of ABA, or a suitable analog, can be sprayed onto the tobacco plant such that stomata remain at least partially closed for a short time period, but then open again to support photosynthesis, akin to the action of root pruning, but without loss of turgor due to water deficit. The effects of spraying ABA on growing tobacco plants as compared to MV is shown in FIG. 3. When administering ABA onto the leaves of the plant or on the soil surrounding the roots of the tobacco plant, preferably an amount of about 0.05 mM to about 1 mM ABA is used, more preferably about 0.1 to about 0.5 mM ABA and most preferably about 0.2 mM to about 0.4 mM ABA.

Jasmonic acid is preferably administered to the leaves or the soil surrounding the roots of the tobacco plants in an amount of about 0.01 mM to about 2.0 mM and more preferably in an amount of about 0.1 mM to about 1 mM.

A further embodiment of the present invention comprises applying an effective amount of at least one plant growth hormone such as abscisic acid (ABA), or one or more of its more stable analogs or jasmonic acid or one or more analogs thereof onto the soil surrounding roots of topped tobacco plants several weeks or days before harvesting. Preferably, the soil treatment is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting).

Typically about 50 mL to about 500 mL of the solution is sprayed per plant, more preferably an amount of about 100 mL to about 300 mL and most preferably about 150 mL to about 250 mL of solution is sprayed onto each plant (e.g., the leaves or the soil surrounding the roots).

5. Stress Inducing Agent

Another embodiment of the present invention comprises spraying a solution containing an effective amount of at least one stress inducing agent such as hydrogen peroxide, NaCl (salt) or sulfur dioxide onto the aerial part (the leaves) of topped tobacco plants several weeks or days before harvesting. Preferably, the spraying is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting).

A further embodiment of the present invention comprises applying a solution containing an effective amount of at least one stress inducing agent such as hydrogen peroxide, a salt (e.g., NaCl) or sulfur dioxide onto the soil surrounding the roots of topped tobacco plants several weeks or days before harvesting. Preferably, the soil treatment is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting).

The foregoing methods of soil treatment and spraying one or more chemical compounds onto the leaves of the tobacco plants before harvesting can be combined with other methods of increasing antioxidants, to reduce nitrosamines in tobacco plants during the curing process. For example, partial removal of the root structure (root pruning) of burley tobacco in the field, about a week before harvesting, results in significant reduction of tobacco-specific nitrosamines during air-curing, probably due to the resulting increase in total antioxidant capacity (measured by the Ferric-Reducing Antioxidant Power assay) that persists during the curing process.

Hydrogen peroxide treatment is preferably applied as a solution containing hydrogen peroxide in a range of about 1% to about 5%, more preferably in a range of about 2% to about 4%, and most preferably in a range of about 2.5% to about 3.5% being sprayed on the leaves and/or onto the soil surrounding the roots.

NaCl is administered to the plant by spraying on the leaves or onto the soil surrounding the roots a solution of sodium chloride comprising about 0.8% to 0.1% sodium chloride, more preferably from about 0.6% to about 0.2% NaCl, and most preferably 0.5% to about 0.3% (e.g., about 0.4%) NaCl.

The sulfur dioxide is administered to the plant in an amount of about 50 nL/L to about 500 nL/L, more preferably in an amount of about 100 nL/L to about 250 nL/L and most preferably in an amount of about 150 nL/L to about 200 nL/L.

Typically about 50 to about 500 mL of a solution with one or more of these reagents is sprayed per plant, more preferably an amount of about 100 to about 300 mL and most preferably about 150 to about 250 mL of solution is sprayed onto each plant.

6. Combinations of Reagents

Also contemplated herein are combinations of reagents. For example, one or more herbicides, stress inducing reagents, plant growth hormones, and plant activators can be combined either in an admixture or applied separately. The combination of reagents can be used to treat the tobacco such that the tobacco has increased antioxidant activity and/or production of antioxidants, which correspondingly reduces TSNAs. Combinations of such reagents include a plant growth hormone in combination with a plant activator (e.g., a salicylic acid combined with jasmonic acid). Additional combinations include jasmonic acid in combination with one or more stress reducing reagents, one or more herbicides, one or more plant activators, or with a different plant growth hormone. When used in combinations, preferably the combinations of reagents may require less of each reagent to be administered to the tobacco plant than if the reagent was administered alone (i.e., not in combination with other antioxidant inducing reagents).

Such combinations can be administered onto the aerial part of a tobacco plant (topped or prior to being topped). The combination of reagents can be administered several weeks or days before harvesting, or both. Preferably, the combination of reagents are applied by spraying. Such spraying can be performed one or more times in the field. Preferably, the spraying of the combination of reagents occurs about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting). The combination of reagents can also be administered to the plant, or portions of the plant (e.g., leaves, stems), after the plant has been harvested.

A further embodiment of the present invention comprises applying a solution containing an effective amount of a combination of reagents onto the soil surrounding the roots of a tobacco plants (topped or prior to topping). The solution can be applied several weeks or days before harvesting the plant. Preferably, the soil treatment is performed one or more times in the field about 1-3 weeks before harvesting (i.e., 4, 5, 6, 7, 8, 9, 10, 11, 12, 13, 14, 15, 16, 17, 18, 19, 20, 21, 22, 23, 24, or 25 days before harvesting). The solution can also be administered to the plant after the plant has been harvested. Typically about 50 to about 500 mL of the solution is sprayed per plant, more preferably an amount of about 100 to about 300 mL and most preferably about 150 to about 250 mL of solution is sprayed onto each plant.

7. Combination of Reagents and Methods for Reducing TSNAs

The reagents discussed above can be used alone to reduce TSNAs or in combination with one another, or in combination with methods which reduce TSNAs. Thus, the methods of treating the soil surrounding the roots or the leaves of the plants with one or more chemical compounds before harvesting can be combined with other methods of increasing antioxidants, to reduce nitrosamines in tobacco plants during the curing process. For example, partial removal of the root structure (root pruning) or xylem cutting of burley tobacco in the field, about a week before harvesting, results in significant reduction of tobacco-specific nitrosamines during air-curing, probably due to the resulting increase in total antioxidant capacity (measured by the Ferric-Reducing Antioxidant Power assay) that persists during the curing process.

The root pruning (or other mechanical stress which produces a similar result) induces water-deficit stress which is believed to result in temporary stomatal closure to preserve water in the plant. Such closure of the stomata also shuts off the supply of atmospheric carbon dioxide that supports photosynthetic carbon dioxide fixation and allows the plant to produce more antioxidants. Other forms of mechanical stress which yield a similar result (i.e., induce production of antioxidants such as xylem cutting) can also be used in combination with any one or combination of the reagents discussed above.

EXAMPLE 1

TSNA Inhibition Using Salicylic Acid or Methyl Viologen

Topped greenhouse tobacco plants were sprayed with aqueous solutions of salicylic acid, methyl viologen and a control substance, in order to measure the total antioxidant capacity ($\mu$mol/g) over 24 hours. Mature burley tobaccos (with about 20-22 leaves per plant) were topped two weeks prior to being sprayed with either salicylic acid or methyl viologen. An aqueous solution of salicylic acid (99%; Aldrich Chemical Co.) at 1 M and methyl viologen (98%; Aldrich Chemical Co.) at 0.1 mM concentration were sprayed upon the tobacco leaves. Each plant was sprayed with at least 200 mL of solution with good coverage of each leaf to produce a more uniform response to the chemical spraying. Green samples were taken 24 hours after spraying. Leaves were checked after sampling to make sure all leaves are representative of the plant conditions. Samples were quickly separated into lamina and midribs as known in the art. Only the lamina was retained for analysis. Sampled green lamina was flashfrozen in liquid nitrogen. The samples can be stored at −80° C. if analysis cannot be performed immediately.

Total antioxidant capacity was determined by FRAP assay, and the values were expressed as μmol/g of fresh weight. The concentration of chlorogenic acid and rutin, two water soluble antioxidants, were measured by HPLC and-their contribution to the total antioxidant capacity (measured by FRAP) was calculated. The results (Table 1) show that both methyl viologen and salicylic acid increase antioxidant capacity.

TABLE 1

|  | Total Antioxidant Capacity (μmol/g) | Antioxidant Capacity of Chlorogenic Acid (μmol/g) | Antioxidant Capacity of Rutin (μmol/g) |
| --- | --- | --- | --- |
| Control | 40 | 12 | 1 |
| Salicylic Acid | 50 | 25 | 1 |
| Methyl Viologen | 55 | 28 | 1 |

The FRAP assay was performed as follows. The green lamina were accurately weighed and extracted with 10% methanol and 0.2 M perchloric acid in water. The mixture was shaken at 4° C. on an orbital shaker for an hour. The extracts were then centrifuged at 5,000 rpm for 20 minutes. The supernatant was filtered through Whatman Autovial 0.45 μm PVDF syringe filters and was ready for analysis after appropriate dilution with extraction solution (10% MeOH and 0.2 M perchloric acid in water).

The procedures for the FRAP assay on tobacco samples were modified from that previously described by Benzie and Strain, *Meth. Enzymology* 299: 15-27 (1999). The assay was done manually on a spectrophotometer at room temperature. The FRAP reagent was prepared by combining 300 mM acetate buffer (pH 3.6), 10 mM 2,4,5-tripyridyl-s-triazine in 40 mM HCl and 20 mM $FeCl_3$ in the ratio of 10:1:1 (v:v:v). A 100 μL aliquot of the sample extraction was added to 3 mL of FRAP reagent and mixed. After the mixture stood at room temperature for 6 min., the absorbance at 593 nm was determined against the FRAP reagent alone. Calibration was against a standard curve (i.e., 500, 1000 and 2000 μM ferrous iron) produced by the addition of freshly prepared ferrous sulfate. FRAP values were calculated as micromolar ferrous ion (ferric reducing power) from two determinations.

Chlorogenic acid (i.e., 3-O-caffeoylquinic acid) and rutin (i.e., quercetin 3-rhamnosidoglucoside) are two antioxidants that are water soluble and can easily be measured in plants. Chlorogenic acid and rutin concentrations were determined by high performance liquid chromatographic (HPLC) analysis. Other polyphenols such as the isomers of chlorogenic acid (i.e., 4-O -, and 5-O-caffeoylquinic acid) and scopoletin (i.e., 6-methoxy-7-hydroxycoumarin) were also separated by reverse phase HPLC using a gradient of methanol with 1% glacial acetic acid. 500 mg of tobacco was extracted with 10% methanol and 0.2 M perchloric acid in water. The supernatant was neutralized using $K_2CO_3$ to a pH of 6.5 before the sample was injected into the HPLC. Umbelliferone (i.e. 7-hydroxycoumarin) was used as an internal standard and detection was by UV absorption at 326 nm.

EXAMPLE 2

The following table (Table 2) shows the results of experiments using an aqueous chemical spray to raise burley native leaf antioxidant capacity in order to interfere with TSNA production during air curing. Burley tobacco plants were grown using standard agronomic practices. ACTIGARD® and MESSENGER® were sprayed on the plants after layby in two-week intervals with a total of five (5) applications of the reagents until the plants were harvested. Treatment with the ACTIGARD® or MESSENGER® at this time in plant growth is not suitable for optimum results for the manufacturer recommended uses of those reagents as plant activators.

At harvest, care was taken to ensure clean tobacco by minimizing contact with the soil. Plants were stalk cut and five stalks were speared on each stick for standard curing in conventional air-curing barns. All treated and control tobaccos were hung with even spacing of sticks. The treated (non-control) tobaccos were surrounded by clean filler tobacco to help to create normal curing conditions. At least three replicate samples were taken at each sampling point from five different plants with 3 leaves from the top one-third of the plant (excluding the top 4 leaves). Each plant was sampled only once. Midveins were separated from the lamina. Both lamina and midveins were weighed and placed in sample bags stored at −80° C. After freeze-drying, samples were re-weighed to determine the moisture content. Samples were ground to pass through a 40-mesh screen and stored at −40° C. until analysis.

FRAP analysis was performed as follows. Freeze-dried samples were accurately weighed and extracted with 10% methanol and 0.2 M perchloric acid in water. The mixture was shaken at 4° C. on an orbital shaker for an hour. The extracts were then centrifuged at 5,000 rpm for 20 minutes. The centrifuged supernatants were then filtered through Whatman Autovial 0.45 PVDF Syringe filters. The filtered material was then diluted as discussed in Example 1 above. The FRAP assay was conducted as described by Benzie and Strain (1999) with the following modifications. The FRAP reagent was prepared daily by combining 300 mM acetate buffer (pH 3.6), 10 mM 2,4,5-tripyridyl-s-triazine in 40 mM HCl and 20 mM $FeCl_3$ in a ratio of 10:1:1 (v:v:v). A 100 μL aliquot of the sample extraction was added to 3,000 μL (3 mL) of FRAP reagent and mixed. After the mixture stood at room temperature for 6 minutes, the absorbance at 593 nm was determined against the FRAP reagent. Calibration was against a standard curve (i.e., 500, 1000 and 2000 μM ferrous ion) produced by the addition of freshly prepared ferrous sulfate. FRAP values were calculated as micromolar ferrous ion (ferric reducing power) from two determinations. The total antioxidant capacity values are expressed in μmol/g of fresh weight.

The treated tobaccos resulted in cured leaves with nearly 30% antioxidant capacity increases and reduction of TSNA of about 65-70% as compared to untreated control samples.

TABLE 2

|  |  | Control No Spray | MES-SENGER® 9 oz/acre | ACTIGARD® 0.25 oz/acre | ACTIGARD® 0.5 oz/acre |
| --- | --- | --- | --- | --- | --- |
| Total Antioxidant Capacity (μmol/g) |  | 55.4 | 70.9 | 71.9 | 59.1 |
| TSNA | Lamina | 3040 | 1443 | 1787 | 1037 |
| TSNA | Mid-rub | 5110 | 1057 | 1624 | 1627 |

EXAMPLE 3

NaCl Induced Inhibition of TSNAs

In tobacco plants, antioxidants interfere with the nitrosation of secondary alkaloids. The amount of antioxidants present at the time of air-curing the tobacco plants is believed to be effective in inhibiting TSNA formation. The objective is to increase the foliar concentration of native antioxidants during senescence and air-curing of burley tobaccos by judicious application of reagents which inhibit TSNAs. For burley tobaccos, application preferably occurs between topping of the tobacco plant and harvest.

High concentrations of sodium chloride (NaCl) cause ionic, osmotic and associated secondary stresses to plants. Plant response to those primary and secondary stresses are complex, but can be grouped into three general categories: homeostasis, detoxification and growth control.

Green house grown burley tobacco plants were sprayed with either 0.7% NaCl, 0.35% NaCl, 0.18% NaCl, or control after topping one week before harvest. Once harvested, the leaves were examined to make sure that the leaves were representative of the plant's condition, as discussed above for Example 1. Samples were rapidly separated into the lamina and midribs. The lamina containing portions were rapidly frozen in liquid nitrogen and either stored at −80° C. or analyzed. Total antioxidant capacity was determined by FRAP assay as discussed above for Example 1 and the values were expressed as μmol/g of fresh weight.

TABLE 3

|  | Control | 0.7% NaCl | 0.35% NaCl | 0.18% NaCl |
| --- | --- | --- | --- | --- |
| Total antioxidant capacity (μmol/g) | 148.4 | 206 | 229 | 175 |

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A method of reducing tobacco-specific nitrosamines in cured tobacco, comprising raising the levels of antioxidants in tobacco leaves by spraying a chemical solution comprising sodium chloride onto leaves of a growing tobacco plant at least one time prior to harvesting, the antioxidants being raised at least 25% compared to harvested tobacco plants grown without being sprayed with the chemical solution, wherein the chemical solution further comprises hydrogen peroxide and/or sulfur dioxide.

2. The method of claim 1, wherein said chemical solution effects reduction in available carbon dioxide used in photosynthesis.

3. The method of claim 1, further comprising preparing cured tobacco by harvesting the tobacco plants and subjecting at least some of the tobacco leaves of the tobacco plants to a curing process, the level of antioxidants in the tobacco leaves being sufficient to reduce nitrosation during the yellowing and browning phases of the curing process.

4. The method of claim 1, wherein the chemical solution contains at least one chemical compound which can affect chloroplast activity, the chemical compound being sprayed onto the tobacco leaves in an amount sufficient to stimulate formation of reactive oxygen species in the tobacco leaves.

5. The method of claim 1, wherein the chemical solution is sprayed onto the tobacco plants at different times prior to harvest.

6. The method of claim 1, wherein the tobacco is burley tobacco, and the method further comprising air curing the burley tobacco after harvesting the tobacco plants.

7. The method of claim 1, further comprising subjecting the growing tobacco plant to mechanical stress sufficient to raise the level of antioxidants in the tobacco leaves.

8. The method of claim 1, wherein the tobacco plants are sprayed only once with the chemical solution at least about one week prior to harvesting of the tobacco plants.

9. The method of claim 1, wherein the tobacco plants are sprayed with the chemical solution between topping to remove the flowers from the tobacco plants and harvesting of the tobacco plants.

10. The method of claim 1, further comprising root pruning or xylem cutting of the tobacco plants.

11. The method of claim 1, wherein said chemical solution further comprises a plant growth hormone.

12. The method of claim 11, wherein the chemical solution contains at least abscicic acid or analog thereof.

13. The method of claim 11, wherein the chemical solution contains at least salicylic acid or analog thereof.

14. The method of claim 11, wherein the chemical solution contains at least jasmonic acid.

15. The method of claim 11, wherein the chemical solution contains at least methyl viologen (MV) or analog thereof.

16. The method of claim 11, wherein said chemical solution further comprises a herbicide, a plant activator, plant growth hormone and/or stress inducing agent.

17. The method of claim 16, wherein the herbicide, activator or growth hormone has an elevated concentration in said chemical solution compared to conventional tobacco plant treating solutions of the same ingredients.

18. The method of claim 11, wherein said chemical solution effects reduction in available carbon dioxide used in photosynthesis.

19. The method of claim 11, further comprising preparing cured tobacco by harvesting the tobacco plants an subjecting at least some of the tobacco leaves of the tobacco plants to a curing process, the level of antioxidants in the tobacco leaves being sufficient to reduce nitrosation during yellowing and browning phases of the curing process.

20. The method of claim 11, wherein said chemical solution contains at least one chemical compound which can affect chloroplast activity, the chemical compound being present in an amount sufficient to stimulate formation of reactive oxygen species in the tobacco leaves.

21. The method of claim 11, wherein said chemical solution is sprayed onto leaves of a growing tobacco plant at different times prior to harvest.

22. The method of claim 11, wherein the tobacco is burley tobacco, and the method further comprising air curing the burley tobacco after harvesting the tobacco plants.

23. The method of claim 11, further comprising subjecting the growing tobacco plant to mechanical stress sufficient to raise the level of antioxidants in the tobacco leaves.

24. The method of claim 11, wherein the leaves of a growing tobacco plant are sprayed only once with said chemical solution at least about one week prior to harvesting of the tobacco plants.

25. The method of claim 11, wherein the leaves are sprayed with said chemical solution between topping to remove the flowers from the tobacco plants and harvesting of the tobacco plants.

26. The method of claim 11, further comprising root pruning or xylem cutting of the tobacco plants.

* * * * *